M. MORATTA.
PISTON RING.
APPLICATION FILED OCT. 18, 1916.
1,285,780.
Patented Nov. 26, 1918.
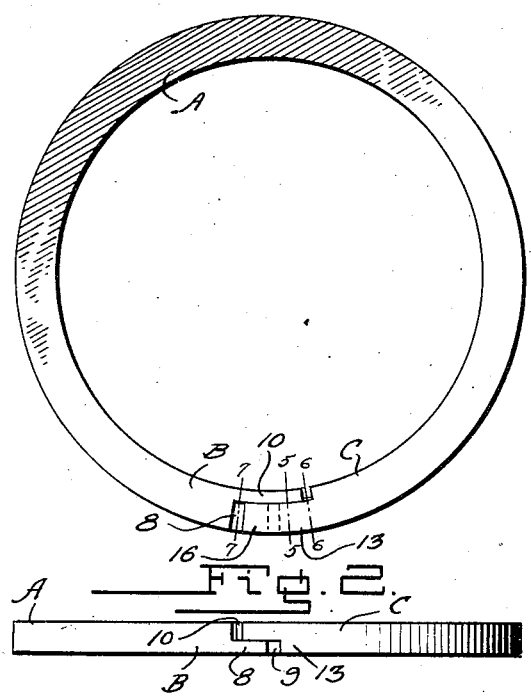
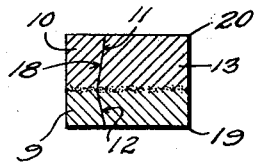
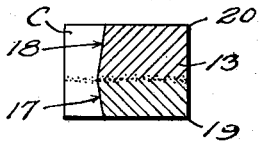
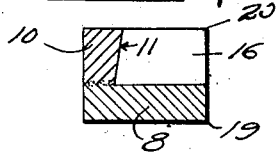
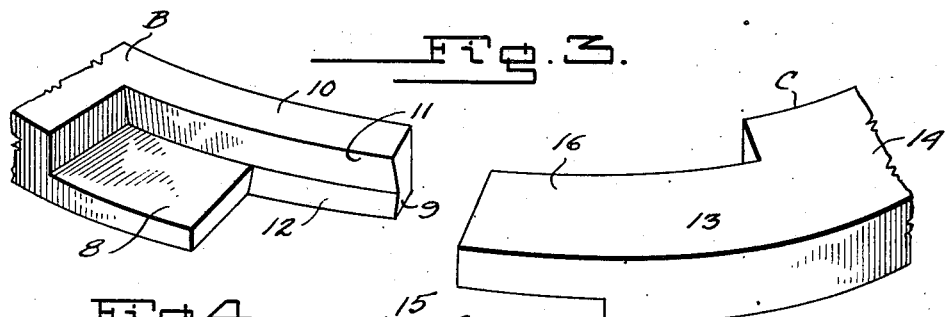
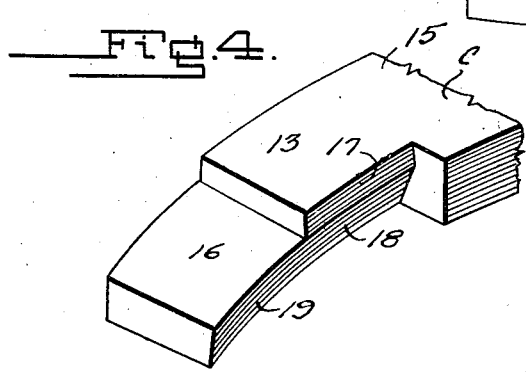
Inventor
Mathew Moratta
By Lancaster and Allwine
his Attorneys

UNITED STATES PATENT OFFICE.

MATHEW MORATTA, OF PRINCETON, INDIANA.

PISTON-RING.

1,285,780.  Specification of Letters Patent.  Patented Nov. 26, 1918.

Application filed October 18, 1916. Serial No. 126,328.

*To all whom it may concern:*

Be it known that I, MATHEW MORATTA, a citizen of the United States, and a resident of Princeton, in the county of Gibson and State of Indiana, have invented certain new and useful Improvements in Piston-Rings, of which the following is a specification.

My present invention relates to improvements in piston rings.

The principal object of my invention is to provide piston rings, the engaging end portions of each ring at the circumferential division so formed as to effectively prevent passage of the motive fluid thereby; resist the forces coming upon said end portions due to reciprocation of the pistons or the impulses of explosions; and, exclude foreign matter from the ring groove of the piston.

Another object of my invention is to provide piston rings of the character set forth which may each be formed of superposed divided annuli of equal or varying thicknesses, welded or otherwise secured together to form a ring with the division of one annulus maintaining the same relative position with respect to the division of the contiguous annulus, thereby facilitating the manufacture of such rings.

Other objects of my invention will appear in the following detailed description, taken in connection with the accompanying drawing, forming a part of this specification, and in which drawing:

Figure 1 is a plan view of a ring constructed according to my invention.

Fig. 2 is a side elevation of the same.

Fig. 3 is an enlarged fragmentary perspective view of the end portions of a ring which are normally in engagement, but each separated in said view, to disclose details.

Fig. 4 is a fragmentary enlarged perspective view of one of said end portions inverted.

Fig. 5 is an enlarged sectional view on the line 5—5 of Fig. 1.

Fig. 6 is a similar view on the line 6—6 of Fig. 1.

Fig. 7 is a view similar to Fig. 5 on the line 7—7 of Fig. 1.

In the drawing, where similar characters refer to similar parts throughout the several views, A designates generally the main body portion of the ring; B one end portion at the circumferential division; and, C, the other end portion at said division.

Referring first to the end portion B, it is provided with a base 8, extending the full width of the main body portion A, as is clearly shown in Fig. 7 of the drawing, a relatively narrower circumferentially extending base projection 9, flush with the internal periphery of the ring; and, a circumferentially extending wall 10 above said base and projection 9 flush with the internal periphery of the ring. For a purpose to be subsequently set forth, it is preferred to provide the outer face 11 of wall 10 converging inwardly with respect to the inner periphery of the ring, toward the base 8, and the outer face 12 of the base projection 9 converging with respect to the inner peripheral face of the ring, toward the wall 10, as is clearly shown in Figs. 5 to 7 of the drawing.

Referring now to the end portion C of the ring, it is formed to provide a circumferentially extending tongue 13 flush with the top face 14, bottom face 15, and external periphery of the ring, said tongue being relatively narrower than the main body portion of the ring, as is clearly shown in Figs. 3 and 4 of the drawing; and a circumferentially extending tongue projection 16 flush with the external periphery of the ring. For a purpose to be subsequently set forth, it is preferred to dispose the inner face 17 of the tongue 13 above the bottom face 15 of the ring, diverging upwardly with respect to the external peripheral face of the ring, and to dispose the inner face 18 of the tongue as well as the inner face 19 of projection 16, below the top of the ring, diverging downwardly with respect to the external peripheral face of the ring, as is clearly shown in Figs. 5 to 7 of the drawing.

It is understood that the ring is made of spring material having an inherent tendency to expand, not only to facilitate placing of the ring in the groove of the piston, but also for the purpose of serving as means to prevent passage of motive fluid from one side of the piston to the other.

The end portions B and C are arranged so that the tongue projection 16 rests upon base 8 and engages its face 19 with the face 11 of wall 10, with surface contact, while the tongue 13 engages its faces 17 and 18 with the faces 11 and 12 of the wall 10 and projection 9, respectively, with surface contact.

It is to be observed that the spring may expand or contract, there being relative sliding movement of one end portion with respect to the other, but there is, at all times, a barrier the full height of the ring to prevent any foreign matter, such as carbon, from finding its way past the body of the ring to the interior of the ring groove, as is obvious from an inspection of Figs. 5 to 7 of the drawing.

The ring may be made of two superposed annuli 19 and 20, the annulus 20 being lowermost, said annuli welded or otherwise secured together to form the ring with the division of one annulus maintaining the same relative position with respect to the division of the contiguous annulus. When so constructed, the base 8 and projection 9 may be formed from one end portion of the annulus 19, while the wall 10 is formed of the one end portion of the superposed annulus 20. The tongue 13 may be formed of the other end portion of the two annuli, while the tongue projection 16 is formed of the end portion of the annulus 20.

Because of the disposition of faces 11 and 12 with respect to the internal periphery of the ring and the faces 17, 18, and 19 with respect to the external periphery of the ring, excessive vibration of the tongue 13 is prevented even though the ring may cling more or less to the wall of the cylinder, as when there is insufficient lubrication, preventing rupturing of the ring at the juncture of tongue 13 with the main body portion A. Also, this arrangement of faces prevents the separation of the two end portions of annuli 19 and 20 making up the tongue 13, when the ring is formed of superposed annuli.

It is preferred to provide the base 8 in height, less than one-half of the height of main body portion A, and the width of wall 10 less than one-half the width of said main body portion, so that the juncture of tongue 13 with the main body portion and the juncture of tongue projection 16 with tongue 13 may be of a cross section sufficient to resist rupturing.

Changes in details may be made without departing from the spirit or scope of my invention; but,

I claim:—

1. A piston ring comprising a main body portion and engaging end portions, one of said end portions provided with a base less in thickness than one-half the thickness of said main body portion, a relatively narrow circumferentially extending base projection projecting from the outer terminal of said base and having its inner surface flush with the internal periphery of the main body portion, and a wall above the said base and said projection having its inner surface flush with the inner periphery of the main body portion, the top surface of said wall equal in width to the lower surface of said projection, the outer faces of said wall and projection inclining oppositely with relation to each other and inwardly toward the inner periphery of the main body portion, the other end portion provided with a circumferentially extending tongue flush with the top, bottom, and external periphery of the ring and having its inner face beveled and sloping toward the top and bottom faces of the ring and engaging said wall and base projection with surface contact, and a circumferentially extending tongue projection flush with the external periphery of the upper face of the ring resting upon said base and having its inner edge inclined in conformity with the upper part of the tongue and engaging said wall laterally with surface contact.

2. A piston ring comprising a main body portion and engaging end portions, one of said end portions provided with a base, a relatively narrower circumferentially extending base projection flush with the internal periphery of the ring, and a wall above the base and the said projection flush with the internal periphery of the ring, the outer faces of said wall and the base projection being inclined inwardly with respect to the internal periphery toward the plane of the upper face of said base; and, the other end portion provided with a circumferentially extending tongue flush with the top, bottom, and external periphery of the ring and having its inner face beveled and sloping toward the top and bottom faces of the ring and engaging said wall and base projection with surface contact, and a circumferentially extending tongue projection flush with the external periphery of the upper face of the ring resting upon said base and having its inner edge inclined in conformity with the upper part of the tongue and engaging said wall laterally with surface contact.

MATHEW MORATTA.